(12) United States Patent
Chandra et al.

(10) Patent No.: US 6,587,860 B1
(45) Date of Patent: Jul. 1, 2003

(54) APPARATUS AND METHOD FOR TRACKING ACCESS TO DATA RESOURCES IN A CLUSTER ENVIRONMENT

(75) Inventors: Tushar Deepak Chandra, New York City, NY (US); Ching-Yun Chao, Austin, TX (US); Roger Eldred Hough, Austin, TX (US); Daniel Ming-Te Hsieh, Austin, TX (US); Rodolfo Augusto Mancisidor-Landa, Austin, TX (US); Javashree Ramanathan, Round Rock, TX (US); Amal Ahmed Shaheen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,225

(22) Filed: Mar. 31, 1999

(51) Int. Cl.[7] ............................................. G06F 17/30
(52) U.S. Cl. ............................. 707/202; 707/1; 707/3; 707/4; 707/9; 707/200; 707/201
(58) Field of Search .................. 709/249, 227, 709/201, 221, 203, 208, 220; 370/390, 408; 707/200, 201, 202; 714/8, 7, 13, 4, 43; 711/163; 712/13, 14, 15; 713/200

(56) References Cited

U.S. PATENT DOCUMENTS

| | | | | |
|---|---|---|---|---|
| 4,432,057 A | * | 2/1984 | Daniell et al. | 707/9 |
| 5,434,994 A | * | 7/1995 | Shaheen et al. | 707/3 |
| 5,796,999 A | * | 8/1998 | Azagury et al. | 707/3 |
| 5,964,886 A | * | 10/1999 | Slaughter et al. | 709/212 |
| 5,996,075 A | * | 11/1999 | Matena | 713/200 |
| 6,014,669 A | * | 1/2000 | Slaughter et al. | 707/1 |
| 6,151,684 A | * | 11/2000 | Alexander et al. | 714/4 |
| 6,161,191 A | * | 12/2000 | Slaughter et al. | 709/201 |
| 6,163,855 A | * | 12/2000 | Shrivastava et al. | 709/208 |
| 6,173,413 B1 | * | 1/2001 | Slaughter et al. | 707/202 |
| 6,189,111 B1 | * | 2/2001 | Alexander et al. | 714/4 |
| 6,192,417 B1 | * | 2/2001 | Block et al. | 709/249 |
| 6,230,183 B1 | * | 5/2001 | Yocom et al. | 709/105 |
| 6,243,814 B1 | * | 6/2001 | Matena | 713/200 |
| 6,243,825 B1 | * | 6/2001 | Gamache et al. | 709/228 |
| 6,360,331 B2 | * | 3/2002 | Vert et al. | 709/239 |
| 6,393,485 B1 | * | 5/2002 | Chao et al. | 709/231 |
| 6,401,120 B1 | * | 6/2002 | Gamache et al. | 709/220 |

* cited by examiner

*Primary Examiner*—Jean M. Corrielus
(74) *Attorney, Agent, or Firm*—Winstead Sechrest & Minick P.C.; Jeffrey S. LaBaw (57) ABSTRACT

Within a computer cluster usage reference counts are maintained for replicated databases within a computer cluster using cluster membership and cluster voting services. Such a method includes the maintaining of a local reference count for all open distributed data resources within a given node, tracking by a group services client of those nodes that have the open distributed data resources, and using cluster membership services to update the local reference counts for node failures.

24 Claims, 8 Drawing Sheets

APPARATUS AND METHOD FOR TRACKING ACCESS TO DATA RESOURCES IN A CLUSTER ENVIRONMENT

CROSS REFERENCE TO RELATED APPLICATIONS

The present invention is related to the following co-pending patent applications:

U.S. patent application Ser. No. 09/282,907 entitled "Error Detection Protocol";

U.S. patent application Ser. No. 09/282,908 entitled "Apparatus and Method for Maintaining Consistency of Shared Data Resources in a Cluster Environment";

which are hereby incorporated by reference herein.

TECHNICAL FIELD

The present invention relates generally to distributed networks, and in particular to core cluster functions for tracking access to data resources in a cluster environment.

BACKGROUND INFORMATION

As computer systems and networks become increasingly complex, the need to have high availability of these systems is becoming correspondingly important. Data networks, and especially the Internet, are uniting the world into a single global marketplace that never closes. Employees, sales representatives, and suppliers in far-flung regions need access to enterprise network systems every hour of the day. Furthermore, increasingly sophisticated customers expect twenty-four hour sales and service from a Web site.

As a result, tremendous competitive pressure is placed on companies to keep their systems running continuously, and to be continuously available. With inordinate amounts of downtime, customers would likely take their business elsewhere, costing a company their goodwill and a revenue loss. Furthermore, there are costs associated with lost employee productivity, diverted, canceled, and deferred customer orders, and lost market share. In sum, network server outages can potentially cost big money.

In the past, companies have run on a handful of computers executing relatively simple software. This made it easier to manage the systems and isolate problems.

But in the present networked computing environment, information systems can contain hundreds of interdependent servers and applications. Any failure in one of these components can cause of cascade of failures that could bring down a server and leave a user susceptible to monetary losses.

Generally, there are several levels of availability. The particular use of a software application typically dictates the level of availability needed. There are four general levels of systems availability: base-availability systems, high-availability systems, continuous-operations environments, and continuous-availability environments.

Base-availability systems are ready for immediate use, but will experience both planned and unplanned outages. Such systems are used for application development.

High-availability systems include technologies that significantly reduce the number and duration of unplanned outages. Planned outages still occur, but the servers also includes facilities that reduce their impact. As an example, high-availability systems are used by stock trading applications.

Continuous-operations environments use special technologies to ensure that there are no planned outages for upgrades, backups, or other maintenance activities. Frequently, companies also use high-availability servers in these environments to reduce unplanned outages. Continuous-operations environments are used for Internet applications, such as Internet servers and e-mail applications.

Continuous-availability environments seek to ensure that there are no planned or unplanned outages. To achieve this level of availability, companies must use dual servers or clusters of redundant servers in which one server automatically takes over if another server goes down. Continuous-availability environments are used in commerce and mission-critical applications.

As network computing is being-integrated more into the present commercial environment, the importance of having high availability for distributed systems on clusters of computer processors has been realized, especially for enterprises that run mission-critical applications. Networks with high availability characteristics have procedures within the cluster to deal with failures in the service groups, and make provisions for the failures. High availability means a computing configuration that recovers from failures and provides a better level of protection against system downtime than standard hardware and software alone.

Conventionally, the strategy for handling failures is through a failfast or failstop function. A computer module executed on a computer cluster is said to be failfast if it stops execution as soon as it detects a severe enough failure and if it has a small error latency. Such a strategy has reduced the possibility of cascaded failures due to a single failure occurrence.

Another strategy for handling system failures is through fault containment. Fault containment endeavors to place barriers between components so that an error or fault in one component will not cause a failure in another.

With respect to clusters, an increased need for high availability of ever increasing clusters is required. But growth in the size of these clusters increases the risk of failure within the cluster from many sources, such as hardware failures, program failures, resource exhaustion, operator or end-user errors, or any combination of these.

Up to now, high availability has been limited to hardware recovery in a cluster having only a handful of nodes. But hardware techniques are not enough to ensure that high availability hardware recovery can compensate only for hardware failures, which accounts for only a fraction of the availability risk factors.

An example for providing high availability has been with software applications clustering support. This technique has implemented software techniques for shared system resources such as a shared disk and a communication protocol.

Another example for providing high availability has been with network systems clustering support. With systems clustering support, failover is initiated in the case of hardware failures such as the failure of a node or a network adapter.

Another aspect of providing system availability is keeping track of the access to data resources such as a database, particularly when the database is distributed across a cluster. For example, an open request for a cluster database causes all of the member nodes to open their respective database. In the cluster environment, if the data resource remains open for use by clients, the database needs to be closed when the client routine terminates. When open everywhere across a cluster, the client accesses for each database must be accounted.

A global count has been typically used to serve this function. But a global access count, stored in a single source accessible by the cluster, has been difficult to use due to the processor time associated with gathering the information regarding access to a data resource and then processing the data to track each of the resources across the cluster. The tracking of this information is further complicated when nodes add or drop from the cluster, requiring further information management by a global access count.

Accordingly, a need exists for tracking the access to cluster data resources with respect to the open or closed state of the resource, and the accesses to the database by a client.

SUMMARY OF THE INVENTION

The present invention addresses the foregoing needs by providing for the maintaining of usage reference counts for replicated databases within a computer cluster using cluster membership and cluster voting services. Such a method includes the maintaining of a local reference count for all open distributed data resources within a given node, tracking by a group services client of those nodes that have the open distributed data resources, and using cluster membership services to update the local reference counts for node failures.

In one embodiment of the present invention, the foregoing method can be implemented within a computer cluster having a plurality of nodes, each having a proxy thread and a service thread, and a reference counter.

In yet another embodiment of the present invention, the method described above can be implemented as a computer program for operation within the computer cluster.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to a specific embodiment for a technique to provide an aspect of high-availability to a cluster, it should be understood that the present invention can be adapted for use with other high-availability techniques. All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Figure 1:
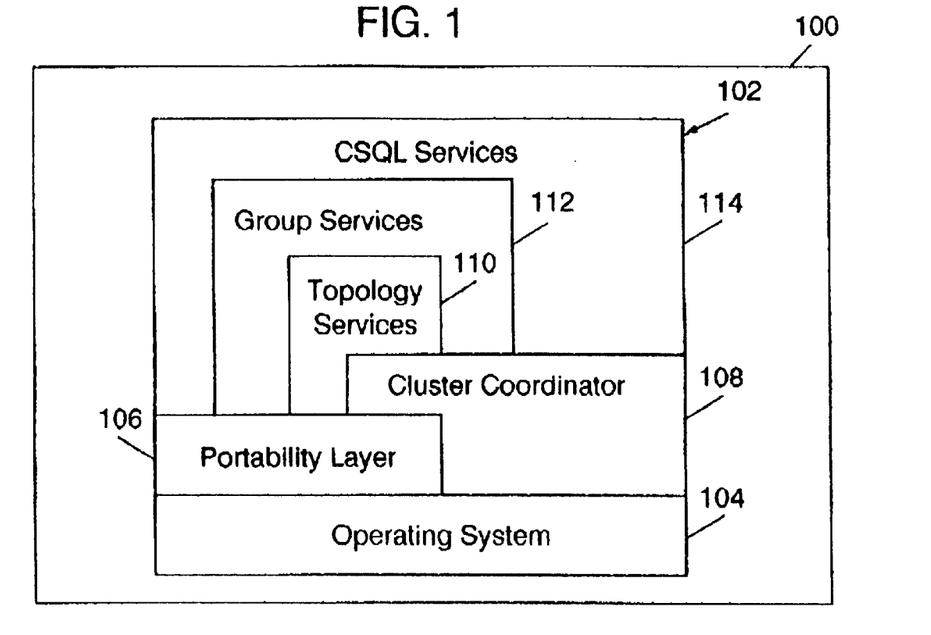
FIG. 1 is a block diagram representation of a computer used for providing a node in the cluster of the present invention.

Referring to FIG. 1, shown is a block diagram representation of a computer 100 used for providing a cluster of the present invention. The computer 100 has suitable hardware and operating system capabilities for providing networking capabilities for communication between different computers, or nodes, in a cluster 200 (see FIG. 2). Each computer 100 used in the cluster 200 has an executable core cluster software services component 102. The core cluster services software component 102 is a middle-ware layer having a set of executables and libraries that run on the resident operating system 104. The core cluster services is 32-bit and SMP (synchronous multi-processor) ready. The core cluster services software component 102 has sub-components that include a portability layer 106, a cluster coordinator 108, topology services 110, group services 112, and a Cluster Search Query Language ("CSQL") services 114.

The portability layer 106 provides a set of common functions used by the other components to access the resident operating system 104 while also masking operating system-dependent implementations, and functions relating to Reliability-Availability-Serviceability ("RAS") facilities such as tracing and logging of computer operations. The portability layer 106 in effect encapsulates operating-system dependent interfaces. Accordingly, the remaining sub-components of the core cluster services software component 102 may interact with the operating system 104 without having to be structured to interact with the particulars of that operating system 104.

The cluster coordinator sub-component 108 provides software facilities for start-up, stop, and restart of the core cluster services 102. Each computer in the cluster 200 has a cluster coordinator, but the individual cluster coordinators do not communicate with each other; the scope of each cluster coordinator sub-component 108 is restricted to the computer 100 on which it runs. The cluster coordinator sub-component 108 is executed first, and then it brings up the other core cluster services sub-components. Also, the cluster coordinator sub-component 108 monitors each of the other services, and restarts the core cluster services component 102 in the event of a failure.

The topology services sub-component 110 exchanges heartbeat messages with topology services in other computers. Heartbeat messages are used to determine which nodes of a cluster 200 are active and running. Each node of a cluster 200 checks the heartbeat of its neighbor node. Through knowledge of the configuration of the cluster 200 and alternate paths, the topology services sub-component 110 can determine if the loss of a heartbeat represents an adapter failure or a node failure. The topology services sub-component 110 maintains information about which nodes are reachable from other nodes, and this information is used to build a reliable messaging facility.

The group services sub-component, or client, 112 allows the formation of process groups containing processes on the same or different machines in the cluster 200. A process can join a group as a provider or a subscriber. Providers participate in protocol action on the group while subscribers are notified on changes to the state of the group or membership in the group. The group services client 112 supports notification on joins and departures of processes to a process group. The group services client 112 also supports a host group that can be subscribed to in order to obtain the status of all the nodes in the cluster. This status is a consistent view of the node status information maintained by the topology services sub-component 110.

With respect to the present invention, the group services client 112 provides cluster-aware functions to handle failure and reintegration of members in a process group. These functions are built on top of the reliable messaging facility being either atomic broadcast, or n-phase commit protocols.

The CSQL services sub-component 114 provides support for databases, which may contain configuration and status information. The CSQL services sub-component 114 can operate in stand-alone or cluster mode. The database of the CSQL services sub-component 114 is a distributed resource which, through the use of the group services client 112, is guaranteed to be coherent and highly available. Each database is replicated across all nodes and check pointed to disk so that changes are retained across reboots of the core cluster services 102. The CSQL services sub-component 114 serves or provides each cluster node with an identical copy of data.

Figure 2:
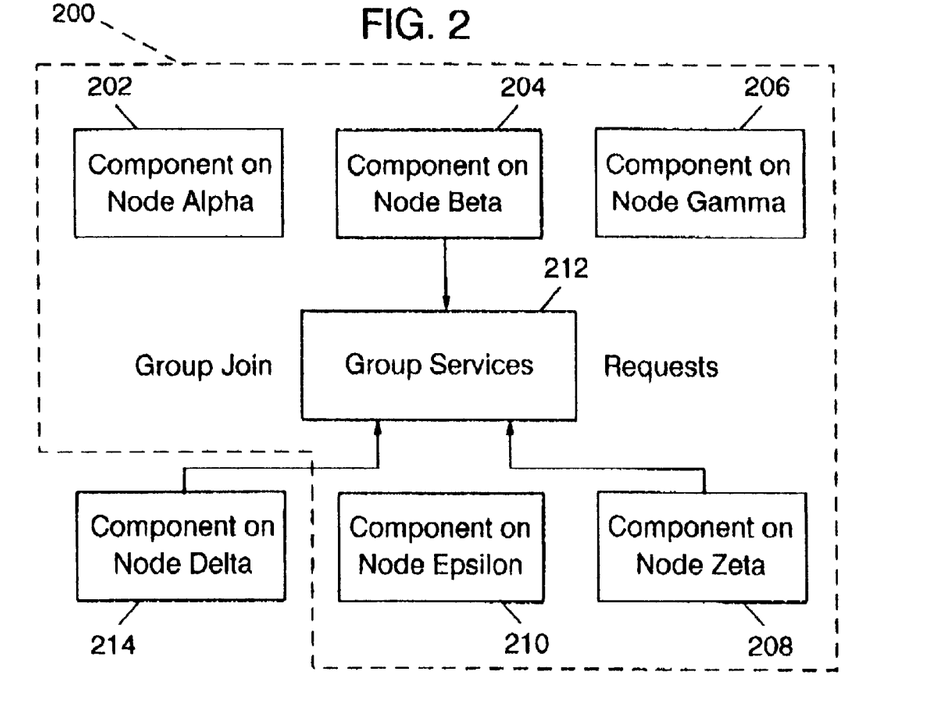
FIG. 2 is a block diagram representing a cluster having a plurality of nodes.

Referring to FIG. 2, shown is a block diagram representing a cluster 200. As an example, the cluster 200 represents an application with components operating on several nodes within the cluster 200. As shown, the cluster 200 has cluster nodes 202, 204, 206, 208, and 210 each executing a component of a software application. Each of the nodes is understood to be provided by a computer 100 as described in detail with respect to FIG. 1. Furthermore, each of the nodes 202, 204, 206, 208, and 210, are members of the cluster 200 because each have a group services client application 112, which collectively provide the group services 212 for the cluster 200.

The members are coordinated by the group services 212. Each of the cluster nodes 202, 204, 206, 208, and 210 have a core cluster services software component 102 with a group services client 112 (see FIG. 1), and each of these nodes are peers with respect to each other.

The group services 212 is formed by the combination of the group services sub-component 112 of the cluster nodes 202, 204, 206, 208, and 210. The term "client" as used herein means, on a network, a computer that accesses shared network resources provided by another computer.

The group services 212 can also support entities known as subscribers. These are cluster nodes that do not directly participate with the group members in planning and executing recovery actions, but are interested in recovery actions taken by the group members.

Accordingly, the group services 212 of the present invention provides updates that are real-time representations that are stored as a replica or copy on each of the cluster nodes 202, 204, 206, 208, 210. The group services 212 also provides cooperative processes to coordinate the maintenance and recovery activities across the cluster 200. An example of an addition of a member or subscriber is shown in FIG. 2, where an application component on node 214 seeks to become a member of the cluster node 200.

The inclusion of a node with respect to the present invention is a function of the shared resources of the cluster 200. For example, if the node 214 either lacks a data resource, such as a database, common to the other nodes of the cluster 200, or has an outdated database, the group services 212 coordinates the installation of a copy of the shared database.

Cluster functions are provided under an n-phase protocol. The n-phase protocol has a set of available votes, which for the present invention is the voting set of {CONTINUE, APPROVE, REJECT}. Each of the nodes participating in the cluster broadcasts a message having a header containing a VOTE field to convey the respective votes of the cluster nodes 202, 204, 206, 208, and 210, and membership seeking node 214. Such messaging formats are known to those skilled in the art. An n-phase refers to the n-series of broadcast/vote sequences generated by the members, or providers, of the cluster 200 to arrive at a consensus with respect to a proposed request.

Figure 3:
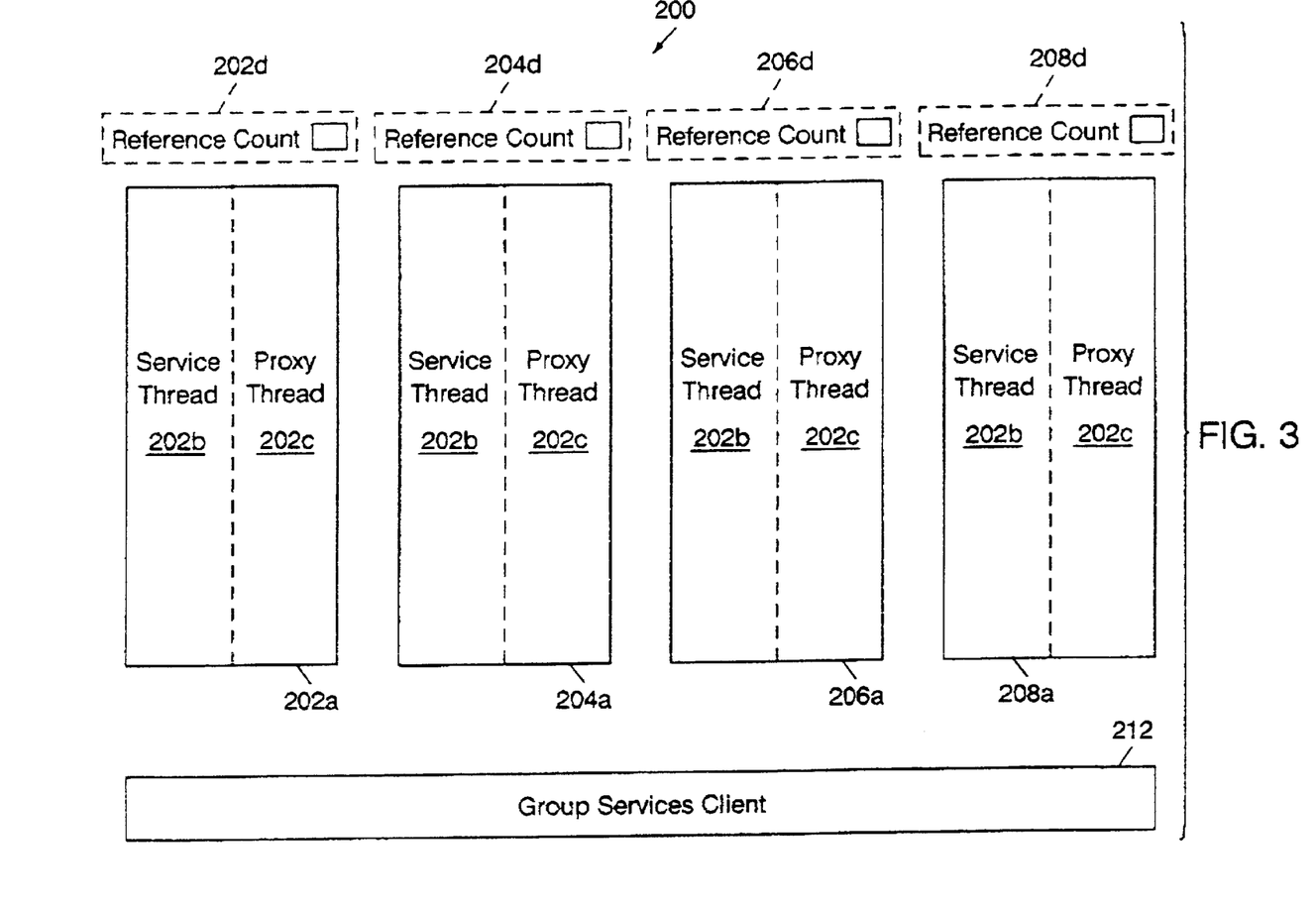
FIG. 3 is a block diagram of a cluster with a plurality of node data resources stored on nodes in the cluster.

FIG. 3 is a block diagram depicting a cluster 200 with the node data resources 202a, 204a, 206a, and 208a, which are stored locally on each of the nodes 202, 204, 206, and 208, respectively (see FIG. 2). Examples of data resources are databases, arrays, and the like. It should be noted that this diagram is provided for purposes of providing an example, and that more nodes or less nodes may constitute a cluster 200. The group services client 212 provides a communications path to the nodes in the cluster 200 by broadcasting data resource modification requests to the cluster 200. Generally, data resource modification requests have at least two common components: OPEN the data resource, and CLOSE the data resource.

Each of the data resources have two threads used by a DRC routine: a service thread 202b, 204b, 206b, and 208b, respectively, and a proxy thread 202c, 204c, 206c, and 208c, respectively. The term "thread" as used herein means a process that is part of a larger process or program.

A service thread handles requests from a local client. A proxy thread handles requests from peer servers, or nodes, in the cluster 200. The term "client" as used herein means processes executing at the same node as the service thread and issues OPEN and/or CLOSE requests for the shared resource.

FIGS. 4A through 4E are flow charts depicting a DRC routine 400 for tracking the state of a distributed cluster resource. As discussed above, each of the nodes node alpha 202, node beta 204, node gamma 206, node zeta 208, node epsilon 210, and node delta 214 each have a local copy of a data resource. These data resources are updated and maintained in a substantially current state by other program routines.

Figure 4A:
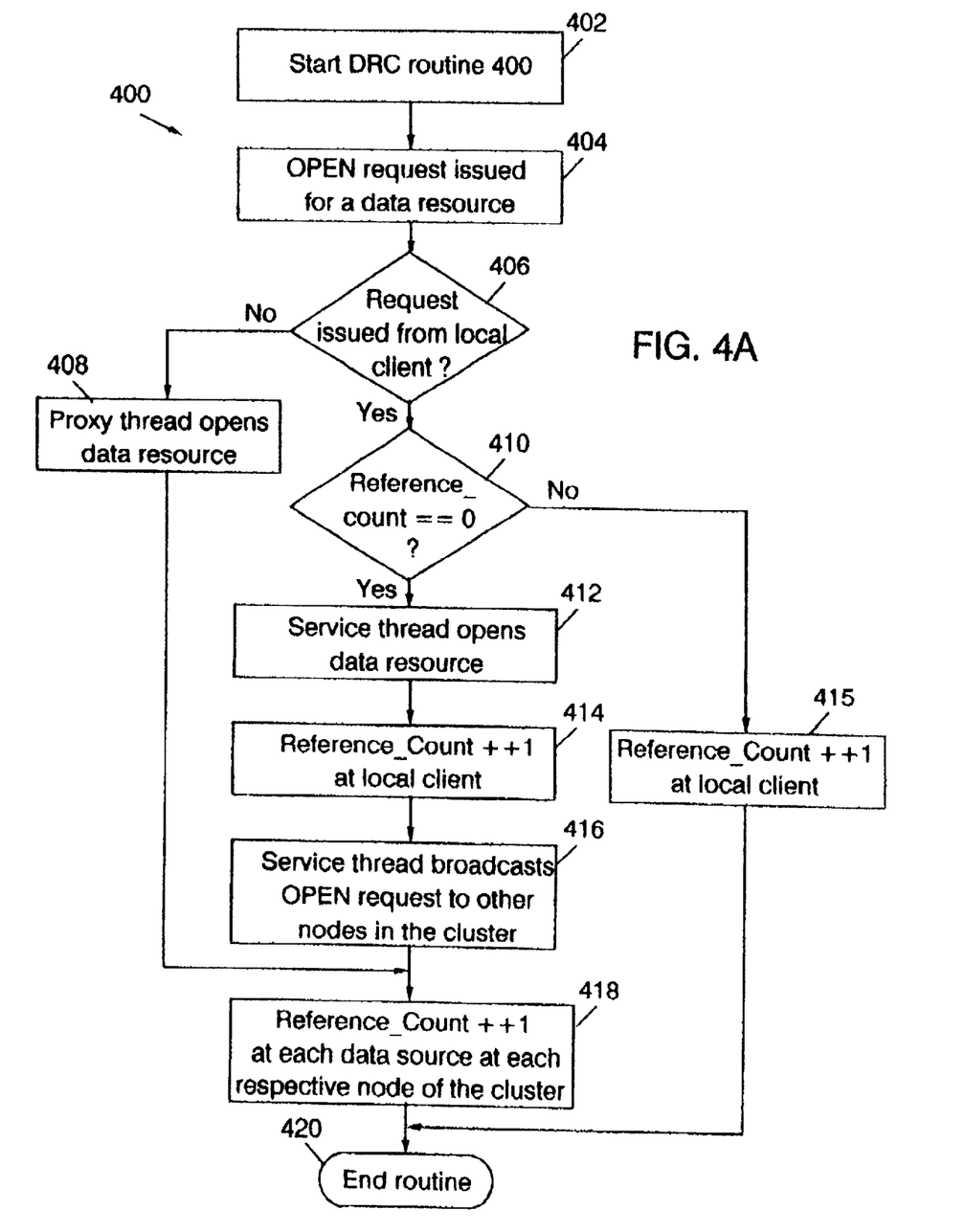
FIGS. 4A–4E illustrate flow diagrams of a distributed reference counting ("DRC") routine for tracking a state of a distributed cluster resource.

At step 402, the DRC routine 400 begins, such as through a program CALL command from the group services client 212. In step 404, an OPEN request for a data resource has been submitted. If at step 406, the OPEN request is not from the local client for that data resource, indicating that the OPEN request was broadcast from the group services client 212 (see FIG. 3), then the proxy thread for the node opens the data resource at step 408.

If the OPEN request was from a local client, as determined in step 406, then the determination is made in step 408 whether the data resource is open by checking the reference_count variable. If the reference_count variable is equal to a "0" value, then the data resource has not been opened, and the service thread for the node opens the data resource at step 412. The reference_count variable or field for the data resource is then incremented at step 414, indicating that the data resource is in an open state. At step 416, the service thread broadcasts the OPEN request to other nodes in the cluster 200.

At step 418, the reference_count variable or field for each of the local data resources at each respective node at the cluster 200 is incremented to indicate an open state. As shown in FIG. 4A, step 408 flows into step 418 for incrementing the reference_count. If the reference count is not equal to a "0" value, then it is incremented at the local client in step 415. The routine 400 then exits at step 420.

Figure 4B:
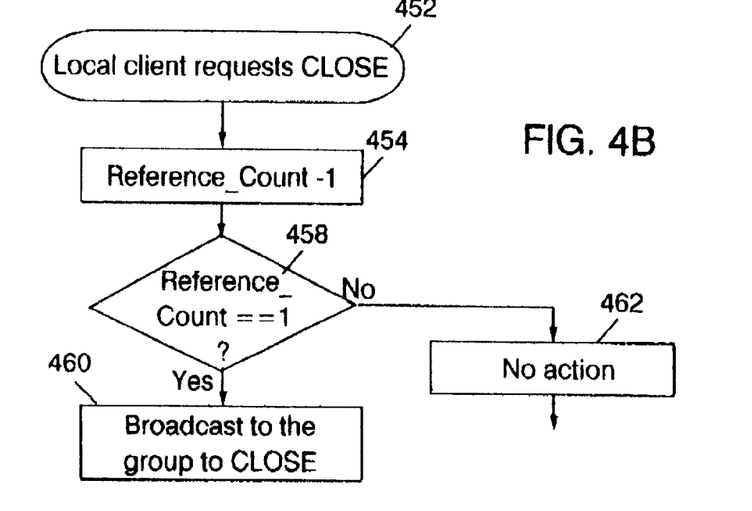
Figure 4C:
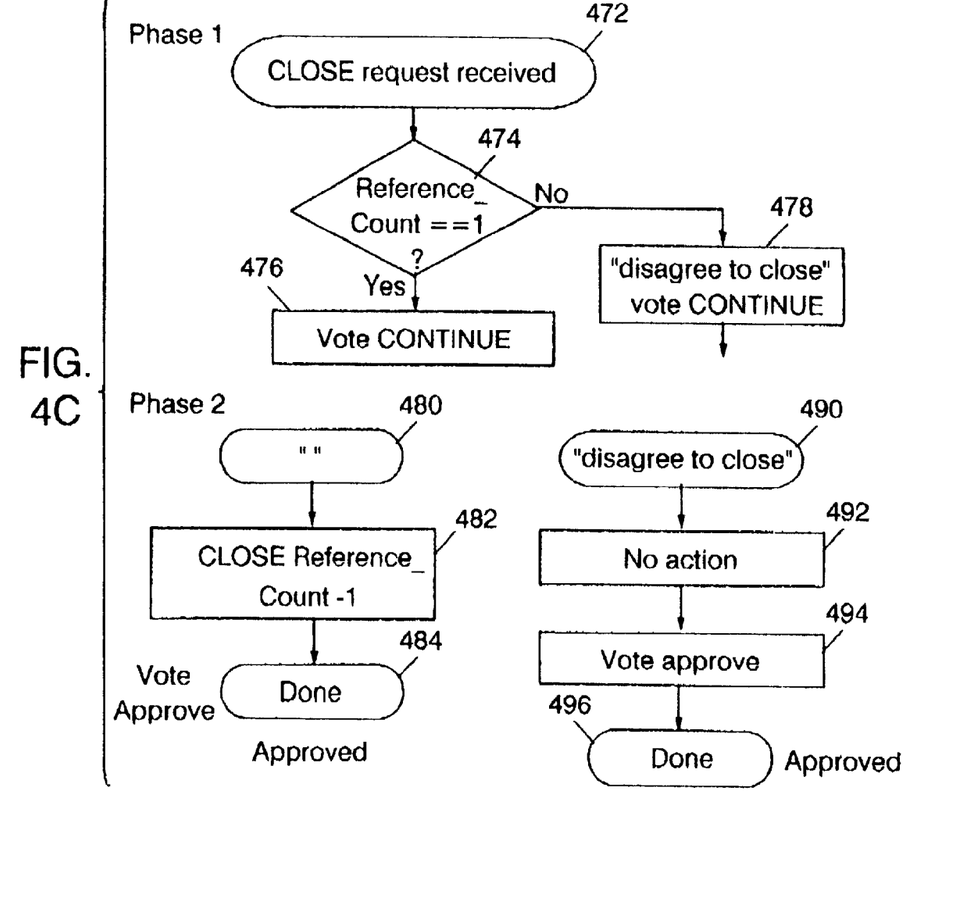
Figure 4D:
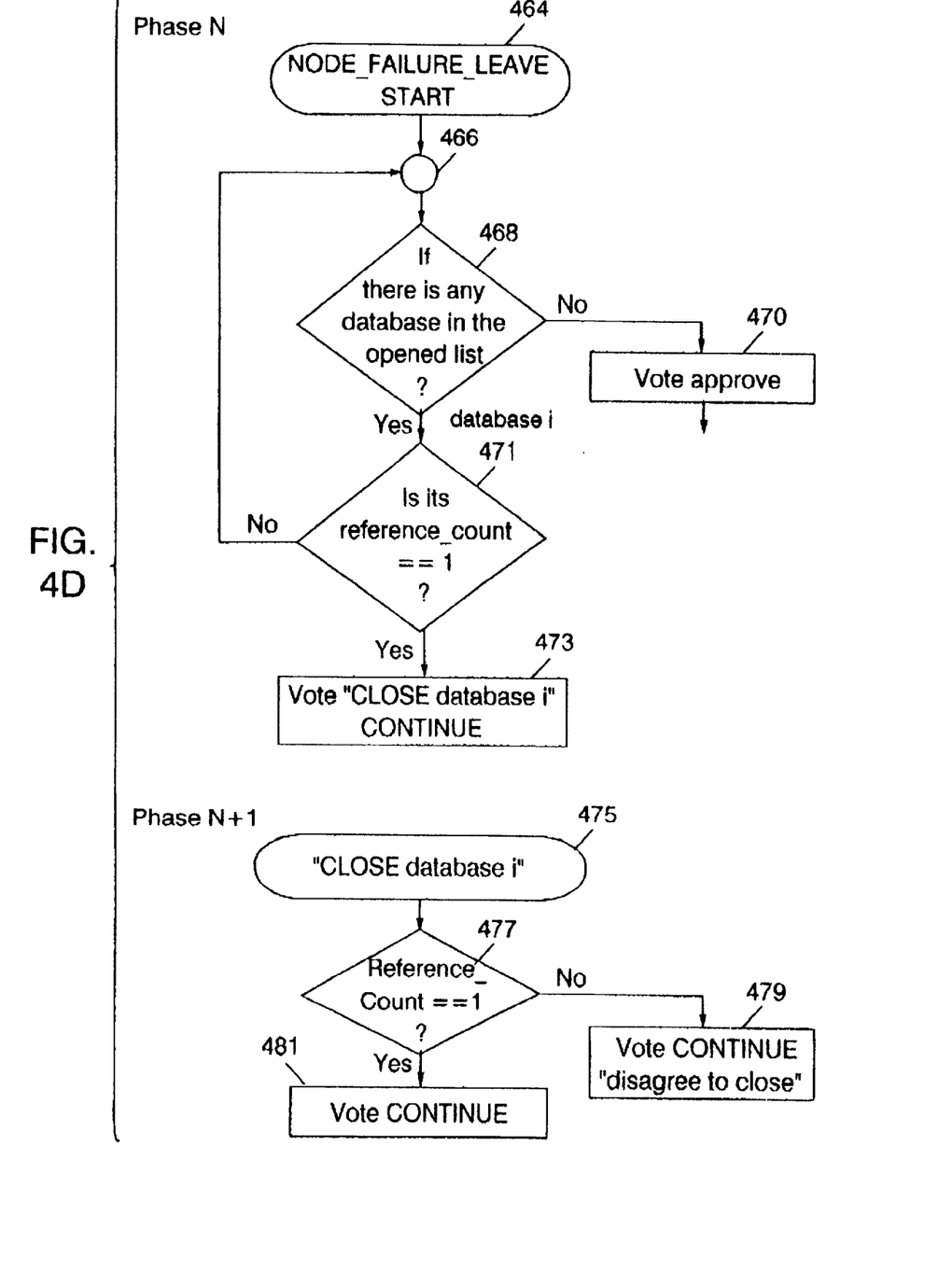
Figure 4E:
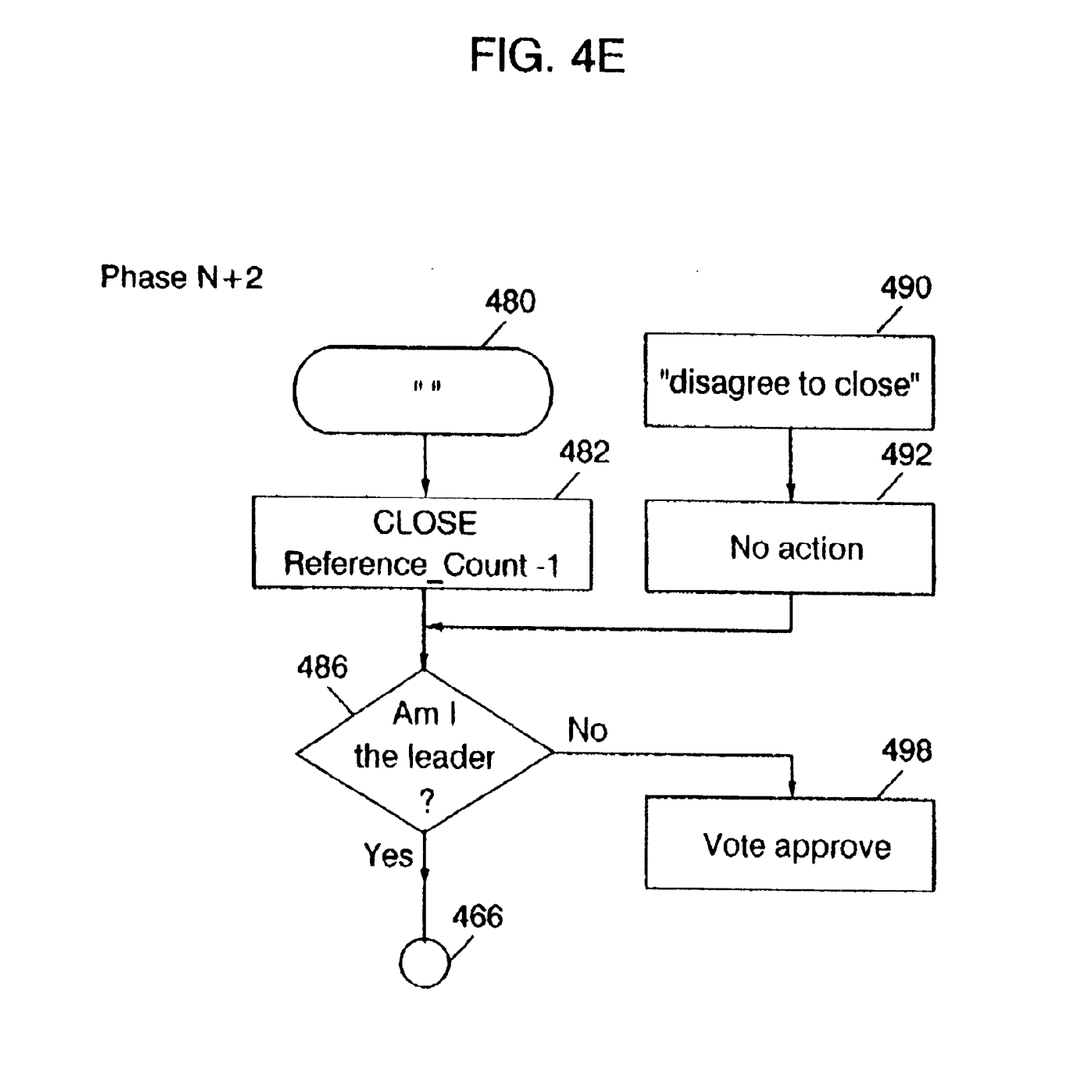
Figure 5:
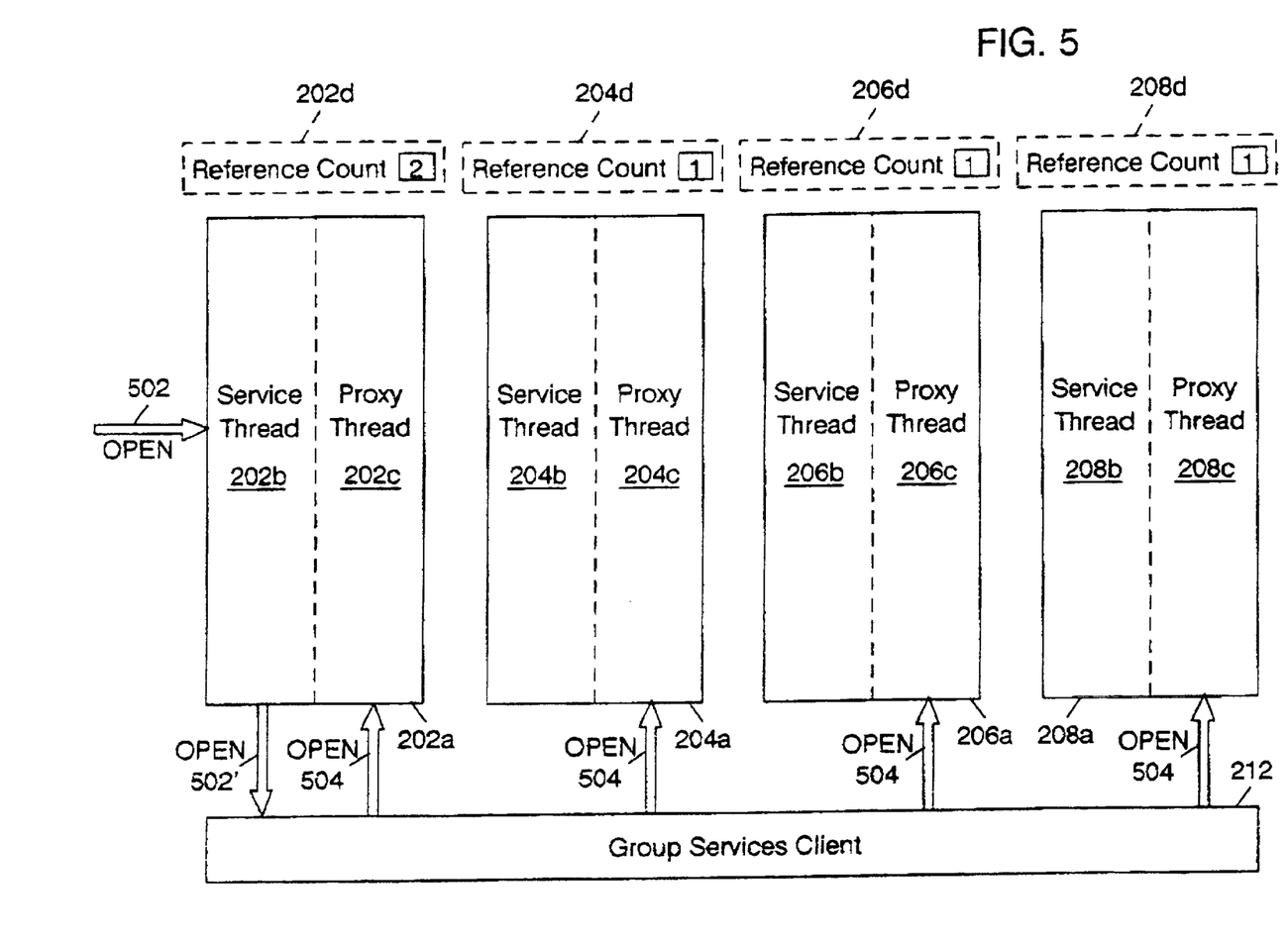
FIG. 5 is a block diagram of a cluster using the DRC routine with respect to an OPEN request issued for a distributed data resource.

FIG. 5 is a block diagram of the cluster 200 illustrating use of the DRC routine 400 of the present invention with respect to an OPEN request issued for a distributed data resource of the cluster 200. As necessary, reference is made to the DRC routine 400 as shown in FIGS. 4A through 4E. As shown, an OPEN request 502 is issued for the data resource 202*a* by a local client. The service thread 202*b* receives the OPEN request and opens the corresponding data resource 202*a*. The reference_count variable or field 202*d* is incremented (see step 414 of FIG. 4A) to reflect the status of the data resource 202*a*.

The local client then sends the OPEN request 502' to the group services client 212, which broadcasts the OPEN request 504 to the nodes of the cluster 200. Accordingly, each of the data resources 202*a*, 204*a*, 206*a*, and 208*a* receives the OPEN request. Because the OPEN request was not from a local client of the node, then the proxy thread 202*c*, 204*c*, 206*c*, and 208*c*, respectively, opens the data resource (see step 408 of FIG. 4A) and increments the reference_count 202*d*, 204*d*, 206*d*, and 208*d*, respectively (see step 418 of FIG. 4A). In the instance where the data resource is already opened by the service thread, then only the reference_count is incremented. Accordingly, the reference_counts for the cluster 200 are as follows:

reference_count 202*d*=2
reference_count 204*d*=1
reference_count 206*d*=1
reference_count 208*d*=1

Figure 6:
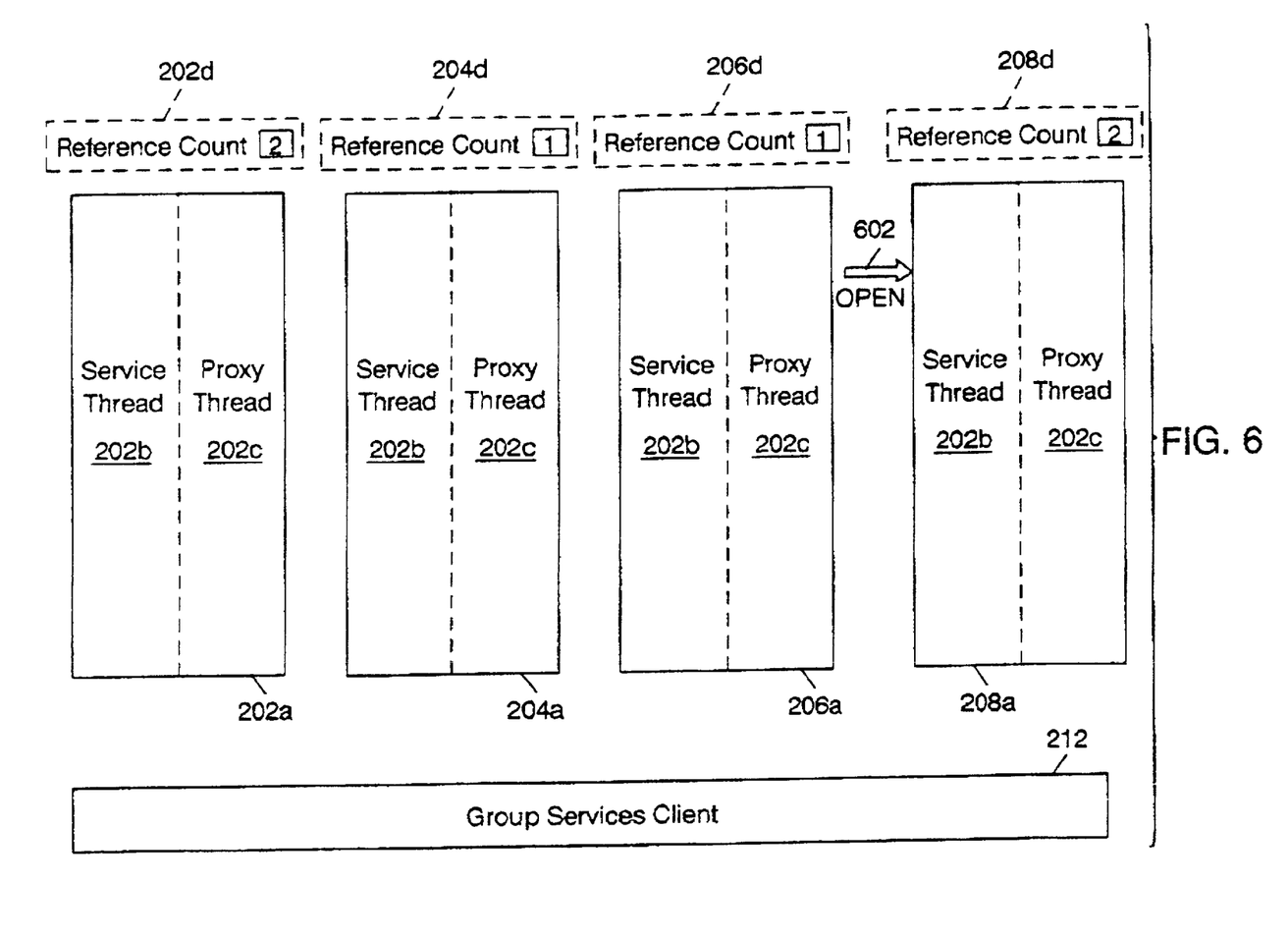
FIG. 6 is a block diagram of a cluster when a data resource will not broadcast an open request.

When the reference_count variables are in the state as shown in FIG. 5, that is, at least having a value of at least one (1), the service thread of that data resource will not broadcast an open request to the cluster 200. An example is shown in FIG. 6, where the reference_count variables before receiving another OPEN request are as follows:

reference_count 202*d*=2
reference_count 204*d*=1
reference_count 206*d*=1
reference_count 208*d*=1

As shown, a local client of the node 208 (see FIG. 2) issues an OPEN request 602 for the data resource 208*a*. Because the request was from a local client (see step 406 of FIG. 4A) and the data resource 208*a* is in an OPEN state (see step 410 of FIG. 4A), then the request is not broadcast to the cluster 200. But, the OPEN request by the local client increments the reference_count 208*d*. Accordingly, the reference_count variables are as follows:

reference_count 202*d*=2
reference_count 204*d*=1
reference_count 206*d*=1
reference_count 208*d*=2

Now referring to FIG. 4B, shown is a further logic flow of the DRC 400 routine with respect to a CLOSE request. At step 452, the CLOSE logic is entered. At step 454, the service thread closes the database which reduces the reference count by one. At step 458, the determination is made whether the reference_count variable for that local data resource is equal to one.

If in step 458 the reference_count is greater than one, then the local data resource is still OPEN by other local clients. The database will not be closed and the service thread enters step 462 and performs no other action. On the other hand if the reference_count is indeed equal to one, the local data resource is no longer OPEN by any local client anymore. Then in step 460, the service thread broadcasts a CLOSE request to the group.

Referring next to FIG. 4C, a proxy thread, as shown in step 472, receives the CLOSE request from group services (see step 460 of FIG. 4B). In step 474, the proxy thread determines whether the reference_count is equal to one. If the reference_count is greater than one, then in step 478 the proxy thread votes to disagree to CLOSE the database. On the other hand, if the reference_count is indeed equal to one, the proxy thread will vote CONTINUE with no message in step 476. This concludes the first phase of the protocol.

In phase 2, there are two possible scenarios. In the first scenario where all proxy threads have a reference_count of one, all proxy threads voted CONTINUE with a blank message in the first phase. As shown in step 480, a proxy thread receives a blank message from a group services broadcast. Each and every proxy thread proceeds to CLOSE the local data resource in step 482 which decrement the reference_count to zero. The database is closed everywhere. All proxy threads vote APPROVE to complete the close request in step 484.

In the second scenario, at least one proxy thread has a reference_count greater than one and voted with an objection to CLOSE. As a result, every proxy thread receives a "disagree to CLOSE" broadcast from group services as shown in step 490. No action will be taken in step 492 and every thread votes APPROVE in step 494 to complete the CLOSE request in step 496.

The same algorithm can be applied to handle node join and node failure events very efficiently. When a new node joins a cluster, it needs to resynchronize its local replica of databases that are opened by the group. It will leave the resynchronized database in an opened state and the reference-count is set to one for each and every database. A reference_count of 1 means that the database is opened by the proxy thread and there is no local client for that database.

When a node fails, remaining nodes will run a NODE_FAILURE_LEAVE protocol. In the protocol, an arbitrary node will examine the list of all OPEN databases and for every database it will examine its reference count. It will request the group to CLOSE a database if its local reference count is 1. Multiple proxy threads may vote with their own CLOSE database message, and one message will be selected by group services. From that point on, the selected thread will assume the leader role and run the NODE_FAILURE_LEAVE protocol to completion. Flow chart for a leader proxy thread is shown in FIG. 4D.

As shown in FIG. 4D, a NODE_FAILURE_LEAVE protocol is proposed by group services in the event of a node failure and the protocol is entered at step 464. The potential leader thread examines its list of OPEN local data resources one after the other in step 468. A proxy thread votes APPROVE in step 470 to complete the protocol if there is no more local data source needs to be processed in step 470. For every local data resource in the list, a proxy thread examines whether the reference_count is greater than one, a proxy thread repeats the process and loops back to step 466. If a local data resource "i" has a reference_count of one, a proxy thread votes CONTINUE with the message "CLOSE database i" in step 473.

All proxy threads in the subsequent phase n+1 receive the broadcast message "CLOSE database i" from group services at step 475 as shown in FIG. 4D. At step 477, each proxy thread examines whether the reference count is greater than one; if yes, the proxy thread votes CONTINUE with a "disagree to CLOSE" message in step 479. A proxy thread votes CONTINUE with a blank message if its reference_count is indeed one in step 481.

The algorithm used in the next phase n+2 as shown on FIG. 4E is very similar to the one used in a regular CLOSE request as illustrated in FIG. 4C. The same numbering are maintained in both sets of flow charts for ease of referencing. The only difference is that in the case of the NODE_FAILURE_LEAVE protocol, a proxy thread votes APPROVE in step 498 if it is not the leader proxy thread and loops back to step 466 on FIG. 4D if it is.

The algorithm can handle multiple node failures. The algorithm will not be affected when nodes fail during its execution even if the leader proxy thread fails. The protocol will complete and group services will start a new NODE_FAILURE_LEAVE protocol for each failed node. All databases that should be closed due to no clients will be closed in the next NODE_LEAVE_LEAVE protocol.

Although the present invention and its advantages have been described in detail, it should be understood that various changes, substitutions and alterations can be made herein without departing from the spirit and scope of the invention as defined by the appended claims.

What is claimed is:

1. A method for maintaining usage reference counts for replicated databases within a computer cluster using cluster membership and cluster voting services, comprising the steps of:

maintaining a local reference count for all open distributed data resources within a given node;

tracking by a group services client of those nodes that have the open distributed data resources; and using cluster membership services to update the local reference counts for node failures.

2. The method as recited in claim 1, wherein the maintaining step further comprises the steps of:

receiving by a node an open request for a specified data resource;

determining if the open request is from a local client of the node;

if the open request is not from the local client of the node, then opening the data resource by a proxy thread in the local client; and if the open request is from the local client of the node, then determining if the local reference count of the local client is equal to zero.

3. The method as recited in claim 2, wherein the maintaining step further comprises the steps of:

if the local reference count of the local client is equal to zero, then (1) opening the data resource by a service thread in the local client, (2) incrementing the local reference count of the local client, and (3) broadcasting, by the service thread, the open request to other nodes in the cluster; and if the local reference count of the local count is not equal to zero, then incrementing the local reference count of the local client.

4. The method as recited in claim 1, wherein the maintaining step further comprises the steps of:

receiving by a node a close request for a specified data resource;

decrementing a local reference count in the node;

determining if the local reference count is equal to 1;

if the local reference count is equal to 1, then broadcasting the close request to other nodes in the cluster via the group services client; and taking no action if the local reference count is greater than 1.

5. The method as recited in claim 4, wherein the maintaining step further comprises the steps of:

receiving, by a proxy thread in one of the other nodes, the broadcasted close request;

determining in the one of the other nodes if the local reference count is equal to 1; and if the local reference count in the proxy thread of the one of the other nodes is greater than 1, then broadcasting to the group services client disagreeing by the proxy thread of the one of the other nodes to close the data resource in the one of the other nodes.

6. The method as recited in claim 5, wherein the maintaining step further comprises the step of:

if the local reference count in the proxy thread of all of the other nodes is equal to 1, then closing, by the all of the other nodes and the one of the other nodes, their respective data resource.

7. The method as recited in claim 1, wherein the using step further comprises the steps of:

if a node in the cluster fails, a designated surviving node examines a list of all opened data resources;

for every one of the opened data resources in the list, a proxy thread in the designated surviving node determines if its local reference count is equal to 1; and if the surviving node determines that its local reference count is equal to 1, then the proxy thread broadcasts a close request to the other surviving nodes in the cluster via the group service client.

8. The method as recited in claim 7, wherein the using step further comprises the steps of:

receiving by proxy threads in the other surviving nodes the broadcasted close request;

for every proxy thread in the other surviving nodes, determining if its local reference count is equal to 1;

for every proxy thread in the other surviving nodes, if its local reference count is greater than 1, then disagreeing to close; and if the local reference counts in the proxy threads of all of the other surviving nodes are equal to 1, then closing the data resource in all of the other surviving nodes.

9. A computer cluster using cluster membership and cluster voting services, comprising:

a plurality of nodes each having a proxy thread and a service thread;

a group services client for tracking which of the plurality of nodes share a distributed data resource;

a local reference counter associated with each of the plurality of nodes; and circuitry for using cluster membership services to update the local reference counters for node failures.

10. The computer cluster as recited in claim 9, further comprising:

circuitry for receiving by one of the plurality of nodes an open request for a specified data resource;

circuitry for determining if the open request is from a local client of the one of the plurality of nodes;

circuitry for opening the data resource by the proxy thread in the local client if the open request is not from the local client; and circuitry for determining if a value in the local reference counter of the local client is equal to zero if the open request is from the local client.

11. The computer cluster as recited in claim 10, if the value of the local reference count of the local client is equal to zero, then the computer cluster further comprises: (1) a service thread in the local client for opening the data resource, (2) circuitry for incrementing the local reference counter of the local client, and (3) circuitry for broadcasting, by the service thread, the open request to other nodes in the cluster; and if the local reference count of the local count is not equal to zero, then the computer cluster further comprises circuitry for incrementing the local reference counter of the local client.

12. The computer cluster as recited in claim 11, further comprising:

circuitry for receiving by one of the plurality of nodes a close request for a specified data resource;

circuitry for decrementing the local reference counter in the one of the plurality of nodes;

circuitry for determining if the value of the local reference counter is equal to 1;

if the local reference count is equal to 1, circuitry for broadcasting the close request to other nodes in the cluster via the group services client; and circuitry for taking no action if the value of the local reference counter is greater than 1.

13. The computer cluster as recited in claim 12, further comprising:

circuitry for receiving, by the proxy thread in one of the plurality of nodes, the broadcasted close request;

circuitry for determining in the one of the plurality of nodes if the value of the local reference counter is equal to 1; and if the value of the local reference counter in the proxy thread of the one of the plurality of nodes is greater than 1, circuitry for broadcasting to the group services client disagreeing by the proxy thread of the one of the plurality of nodes to close the data resource in the one of the plurality of nodes.

14. The computer cluster as recited in claim 13, further comprising:

if the local reference count in the proxy thread of all of the plurality of nodes is equal to 1, circuitry for closing, by the all of the plurality of nodes their respective data resource.

15. The computer cluster as recited in claim 9, wherein the using circuitry further comprises:

if a node in the cluster fails, circuitry in a designated surviving node for examining a list of all opened data resources;

for every one of the opened data resources in the list, circuitry in the proxy thread in the designated surviving node for determining if a value in its local reference counter is equal to 1; and if the surviving node determines that the value in its local reference counter is equal to 1, circuitry in the proxy thread for broadcasting a close request to the other surviving nodes in the cluster via the group service client.

16. The computer cluster as recited in claim 15, wherein the using circuitry further comprises the steps of:

circuitry for receiving by proxy threads in the other surviving nodes the broadcasted close request;

for every proxy thread in the other surviving nodes, circuitry for determining if the value in its local reference counter is equal to 1;

for every proxy thread in the other surviving nodes, if the value in its local reference count is greater than 1, circuitry for disagreeing to close; and if the values in the local reference counter in the proxy threads of all of the other surviving nodes are equal to 1, circuitry for closing the data resource in all of the other surviving nodes.

17. A computer program product adaptable for storage on a computer readable medium, the computer program product operable for maintaining usage reference counts for replicated databases within a computer cluster using cluster membership and cluster voting services, comprising program steps operable for:

maintaining a local reference count for all open distributed data resources within a given node;

tracking those nodes that have the open distributed data resources; and using cluster membership services to update the local reference counts for node failures.

18. The computer program product as recited in claim 17, wherein the maintaining program step further comprises the program steps operable for:

receiving at a node an open request for a specified data resource;

determining if the open request is from a local client of the node;

if the open request is not from the local client of the node, then opening the data resource by a proxy thread in the local client; and if the open request is from the local client of the node, then determining if the local reference count of the local client is equal to zero.

19. The computer program product as recited in claim 18, wherein the maintaining program step further comprises the program steps operable for:

if the local reference count of the local client is equal to zero, then (1) opening the data resource by a service thread in the local client, (2) incrementing the local reference count of the local client, and (3) broadcasting the open request to other nodes in the cluster; and if the local reference count of the local count is not equal to zero, then incrementing the local reference count of the local client.

20. The computer program product as recited in claim 17, wherein the maintaining program step further comprises the program steps operable for:

receiving by a node a close request for a specified data resource;

decrementing a local reference count in the node;

determining if the local reference count is equal to 1;

if the local reference count is equal to 1, then broadcasting the close request to other nodes in the cluster via the group services client; and taking no action if the local reference count is greater than 1.

21. The computer program product as recited in claim 20, wherein the maintaining program step further comprises the program steps operable for:

receiving, by a proxy thread in one of the other nodes, the broadcasted close request;

determining in the one of the other nodes if the local reference count is equal to 1; and if the local reference count in the proxy thread of the one of the other nodes is greater than 1, then broadcasting to the group services client disagreeing by the proxy thread of the one of the other nodes to close the data resource in the one of the other nodes.

22. The computer program product as recited in claim 21, wherein the maintaining program step further comprises the program step operable for:

if the local reference count in the proxy thread of all of the other nodes is equal to 1, then closing, by the all of the other nodes and the one of the other nodes, their respective data resource.

23. The computer program product as recited in claim 19, wherein the using program step further comprises the program steps operable for:

if a node in the cluster fails, a designated surviving node examines a list of all opened data resources;

for every one of the opened data resources in the list, a proxy thread in the designated surviving node determines if its local reference count is equal to 1; and if the surviving node determines that its local reference count is equal to 1, then the proxy thread broadcasts a close request to the other surviving nodes in the cluster via the group service client.

24. The computer program product as recited in claim 23, wherein the using program step further comprises the program steps operable for:

receiving by proxy threads in the other surviving nodes the broadcasted close request;

for every proxy thread in the other surviving nodes, determining if its local reference count is equal to 1;

for every proxy thread in the other surviving nodes, if its local reference count is greater than 1, then disagreeing to close; and if the local reference counts in the proxy threads of all of the other surviving nodes are equal to 1, then closing the data resource in all of the other surviving nodes.

* * * * *